United States Patent
Kobayashi

(10) Patent No.: US 8,887,397 B2
(45) Date of Patent: Nov. 18, 2014

(54) DOOR INNER PANEL FOR AUTOMOBILE AND METHOD OF MANUFACTURING SAME

(71) Applicant: Suzuki Motor Corporation, Shizuoka-Ken (JP)

(72) Inventor: Yoshitaka Kobayashi, Shizuoka-Ken (JP)

(73) Assignee: Suzuki Motor Corporation, Hamamatsu-Shi, Shizuoka-ken (JP)

( * ) Notice: Subject to any disclaimer, the term of this patent is extended or adjusted under 35 U.S.C. 154(b) by 32 days.

(21) Appl. No.: 13/772,451

(22) Filed: Feb. 21, 2013

(65) Prior Publication Data

US 2013/0227890 A1 Sep. 5, 2013

(30) Foreign Application Priority Data

Mar. 2, 2012 (JP) ................. 2012-046277

(51) Int. Cl.
| | |
|---|---|
| B21D 53/88 | (2006.01) |
| B60J 5/04 | (2006.01) |
| B23P 15/00 | (2006.01) |
| B32B 7/04 | (2006.01) |
| B32B 15/01 | (2006.01) |

(52) U.S. Cl.
CPC ................. *B60J 5/047* (2013.01); *B23P 15/00* (2013.01); *B32B 7/04* (2013.01); *B32B 15/011* (2013.01); *B60J 5/048* (2013.01)
USPC ......................................... 29/897.2; 296/146.5

(58) Field of Classification Search
CPC ....... B21D 53/88; B62D 65/00; B60J 5/0479; B60J 5/0463; B60J 5/0416
USPC ............ 29/897.2, 525.13, 525.14; 296/146.1, 296/146.5, 146.6, 191
See application file for complete search history.

(56) References Cited

U.S. PATENT DOCUMENTS 6,513,860 B1 * 2/2003 Ourchane et al. .......... 296/146.5
7,959,212 B2 * 6/2011 Gress et al. ................ 296/146.5

FOREIGN PATENT DOCUMENTS

JP 2011143892 A 7/2011

* cited by examiner

*Primary Examiner* — Ryan J Walters
(74) *Attorney, Agent, or Firm* — Barnes & Thornburg LLP

(57) ABSTRACT

A door inner panel as automobile parts is manufactured from a tailor welded blank formed from a different thickness steel sheet by means of different thickness connection for connecting different kind steel sheets having different sheet thicknesses. In the tailor welded blank, a weld line of the tailor welded blank includes linear weld line portions and a curved weld line portion through which the linear weld lines are connected.

3 Claims, 5 Drawing Sheets

DOOR INNER PANEL FOR AUTOMOBILE AND METHOD OF MANUFACTURING SAME

PRIORITY CLAIM

This patent application claims priority to Japanese Patent Application No. 2012-046277, filed 2 Mar. 2012, the disclosure of which is incorporated herein by reference in its entirety.

BACKGROUND OF THE INVENTION

1. Field of the Invention

The present invention relates to a door inner panel as automobile parts and a method of manufacturing the same.

2. Description of the Related Art

Door inner panels using steel sheets having different thicknesses (tailor welded blank) are used for vehicle side doors or vehicle back doors of automobiles. The steel sheets having different thicknesses (which are called different thickness steel sheets) are formed using different thickness connection technology by means of butt welding.

The door inner panel as opening/closing door for an automobile is composed of the tailor welded blank (which is a member or parts after joining different thickness steel sheets) in which a thick sheet is provided in a desired region on a hinge side of each door inner panel such that a door mounting portion (a hinge portion) with which each door inner panel is mounted to a vehicle body has enough hinge rigidity.

In the door inner panels, the thick sheet is preferably provided in a smallest region for the purpose of weight saving within a range in which the rigidity of the hinge portion is ensured. However, a weld line in the different thickness connection is fixed in position in the door inner panels in view of panel formability. The thick sheet is thus provided not only in a minimum required region, but also in an unnecessary region. Thus, the door inner panels increase in weight.

To solve such inconvenience, a method of manufacturing a door inner panel, in which a plurality of panels, at least three steel sheets, with different sheet thicknesses are linearly welded together to constitute a different thickness steel sheet so as to enable weight saving, has been proposed (Patent Document 1: Japanese Patent Laid-Open Publication No. 2011-143892).

In the conventional door inner panel obtained by the different thickness connection technology in which at least three steel sheets (panels) are butted and linearly welded together, butting accuracy is deteriorated by thermal strain at an intersection between weld lines or a corner portion thereof at the time of butt welding between the panels. Thus, the weld joining cannot be performed at high accuracy.

In addition, since the intersection or the corner portion is subjected to heat input twice, a welding failure tends to occur. Moreover, in the door inner panel obtained by the butt welding of at least three steel sheets, stress concentration occurs in the intersection between weld lines or the corner portion thereof due to its shape. Thus, there also occurs a defect such that a crack is generated in press forming after the butt welding.

As described above, the door inner panel using the different thickness steel sheets, into tailor welded blank, formed by the linear butt welding of at least three steel sheets (panels) in conventional technology provides defects or inconveniences such that a welding failure tends to occur since the intersection between weld lines or the corner portion thereof is subjected to heat input twice, and that it is difficult to perform the press forming due to the weld shape in which stress concentration occurs.

SUMMARY OF THE INVENTION

The present invention has been made in consideration of the circumstances mentioned above, and an object thereof is to provide a door inner panel as automobile parts capable of simplifying a welding process, avoiding stress concentration due to shapes of different steel sheets, and thereby improving welding accuracy and quality by connecting linear weld lines via a curved weld line while performing lap welding along the curved weld line in the different thickness steel sheets (tailor welded blank) formed by welding together steel sheets with different sheet thicknesses, and also provide a method of manufacturing such the door inner panel.

The above and other objects can be achieved according to the present invention by providing, in one aspect, a door inner panel as automobile parts composed of a tailor welded blank formed from a different thickness steel sheet by means of different thickness connection between different kind steel sheets having different sheet thicknesses, wherein a weld line of the tailor welded blank includes linear weld line portions and a curved weld line portion through which the linear weld lines are connected.

In a preferred embodiment of this aspect, it may be desired that the different thickness steel sheet is composed of the two different kinds of steel sheets of a thin sheet and a thick sheet, in which the different kinds of steel sheets are joined together by means of butt welding performed along the linear weld line portions and by means of lap welding performed along the curved weld line portion.

The tailor welded blank may be fabricated by the steel sheets of the thin sheet and the thick sheet by performing the butt welding along the linear weld line portions and the lap welding along the curved weld line portion.

It may be further desired that the thick sheet of the different thickness steel sheet is formed with a hinge portion so as to connect the door inner panel to a vehicle body through the hinge portion, and the curved weld line portion is punched out by means of press forming after the weld joining to provide an opening portion.

In another aspect of the present invention, there is also provided a method of manufacturing a door inner panel as automobile parts, comprising the steps of:

preparing two different kinds of steel sheets of a thin sheet and a thick sheet, the thin sheet having a cutout portion with a curved portion, and the thick sheet being arranged in the cutout portion of the thin sheet;

overlapping the thin sheet and the thick sheet at the curved portion to form an overlap margin portion;

performing butt welding between linear portions of the cutout portion of the thin sheet and the thick sheet to form linear weld line portions; and performing lap welding at the overlap margin portion between the thin sheet and the thick sheet to connect the linear weld line portions via a curved weld line portion to thereby form a different thickness steel sheet as a tailor welded blank.

In the above manufacturing method, it may be desired that the overlap margin portion of the tailor welded blank is cut out by press forming after the weld joining between the thin sheet and the thick sheet to form an opening portion.

A hinge portion may be formed in the thick sheet of the different thickness steel sheet to connect the door inner panel to a vehicle body through the hinge portion.

According to the present invention of the structure and characters mentioned above, the weld line of the different thickness steel sheet formed into a tailor welded blank through the different thickness connection between the different kinds of steel sheets having different sheet thicknesses has the line portion including the linear weld line portions, and the curve shaped weld line portion that connects the weld line portions. Accordingly, it is not necessary to perform butt welding along the R-shaped weld line portion, thus simplifying a welding process, thereby improving welding accuracy. In addition, stress concentration due to a weld shape can be avoided, thereby effectively preventing damage due to occurrence of a crack or the like for the manufacturing a door inner panel of an automobile, or like.

The nature and further characteristic features of the present invention will be made clearer from the following descriptions made with reference to the accompanying drawings.

DESCRIPTION OF THE PREFERRED EMBODIMENT

Figure 1:
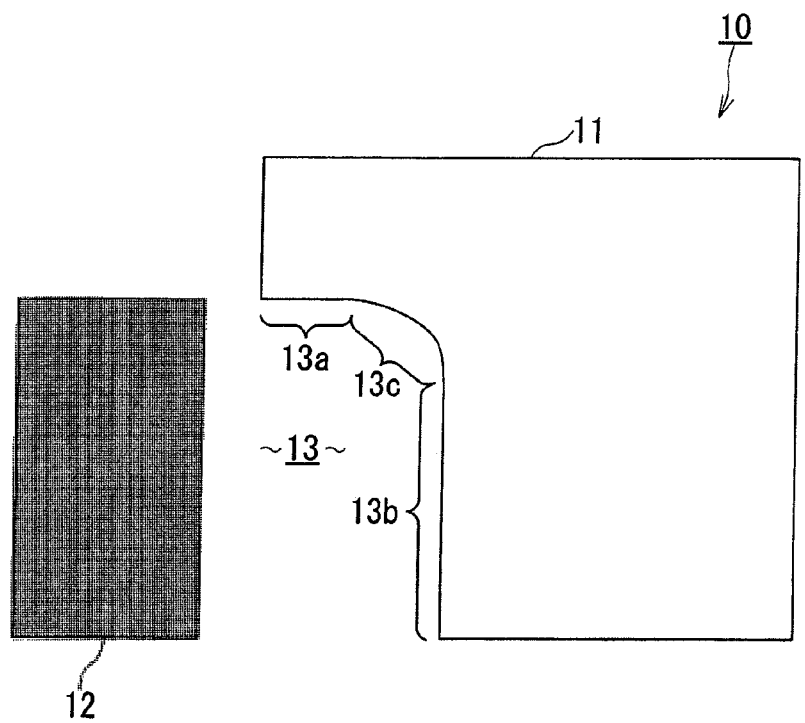
FIG. 1 is a view illustrating a configuration example of a thin sheet and a thick sheet that constitute a tailor welded blank after joining of different thickness steel sheets used for a door inner panel as automobile parts according to the present invention.

In the following, embodiments of a door inner panel as automobile parts according to the present invention will be described with reference to the accompanying drawings. Further, it is first to be noted that the reference numeral 10 are applied selectively to "different thickness steel sheet 10" and "tailor welded blank 10", and the former means a sheet before the welding of two different steel sheet is performed, and the later means a sheet (blank) after the two different thickness steel sheets are butt-welded).

Figure 2:
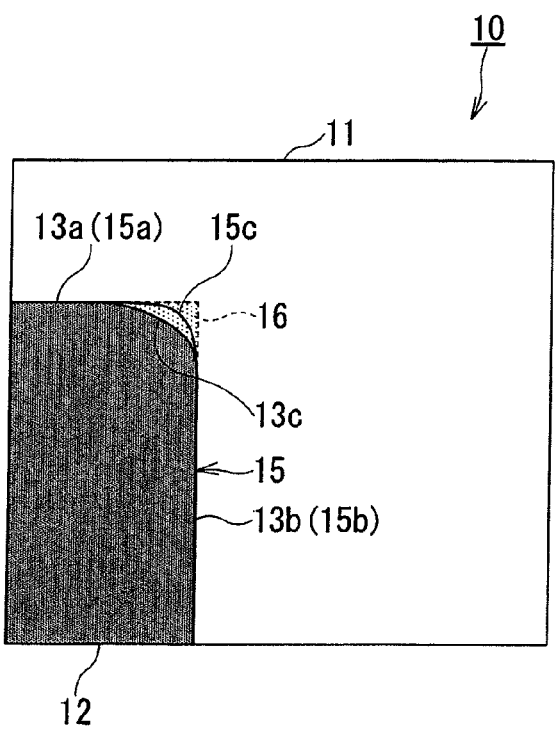
FIG. 2 is a view illustrating an example of a tailor welded blank (different thickness steel sheets) formed by different thickness connection between the thin sheet and the thick sheet shown in FIG. 1.

FIGS. 1 and 2 show an example of a different thickness steel sheets (or a tailor welded blank) 10 that constitutes the door inner panel as automobile parts. The different thickness steel sheet 10 is a tailor welded blank formed by joining two different kinds of steel sheets with different sheet thicknesses by different thickness connection.

The different thickness connection means so-called tailor welded blank in which steel sheets of a thin sheet 11 and a thick sheet 12 with different sheet thicknesses or materials are welded and joined together by means of laser welding or the like means before press forming, to obtain a single different thickness steel sheet, i.e., tailor welded blank.

The tailor welded blank (different thickness steel sheet) 10 is obtained by integrating the steel sheets of the relatively thin sheet 11 and the relatively thick sheet 12 by means of weld joining. For example, a steel sheet of about 0.7 mm is used as the thin sheet 11, and a steel sheet of about 1.2 mm is used as the thick sheet 12. The different thickness steel sheet 10 is composed of two segmented regions of the thin sheet 11 and the thick sheet 12. The thin sheet 11 occupies 70% or more, and the thick sheet 12 occupies 30% or less of the area. For example, the thin sheet 11 and the thick sheet 12 have an area ratio of about 8:2 for the purpose of weight saving.

A cutout portion 13 is formed in the thin sheet 11 of the different thickness steel sheet 10 by cutting out one side portion of a rectangular thin sheet as shown in FIG. 1. The cutout portion 13 is defined by linear (end) edge portions 13a and 13b, and a curve shaped edge portion 13c that connects the (end) edge portions. The thick sheet 12 having a rectangular shape is placed in the cutout portion 13 of the thin sheet 11 of the different thickness steel sheet 10.

When the thick sheet 12 is arranged in, i.e., engaged with, the cutout portion 13 of the thin sheet 11, the linear (end) edge portions 13a and 13b of the thin sheet 11 are butted against side edges of the thick sheet 12, and the curve shaped edge portion 13c of the thin sheet 11 is overlapped with a corner portion of the thick sheet 12.

As shown in FIG. 2, linear portions of the cutout portion 13 of the thin sheet 11 and the thick sheet 12 are butt-welded together by laser welding or the like to thereby form linear weld lines 15a and 15b. The linear weld lines are further connected via a curve shaped weld line 15c by the weld joining. The tailor welded blank as the different thickness steel sheet 10 is thereby fabricated.

The linear weld lines 15a and 15b of the different thickness steel sheet 10 are welded with the two types of the thin sheet 11 and the thick sheet 12 having different sheet thicknesses by being butted against each other. It is preferable that the thin sheet 11 and the thick sheet 12 basically have no space (0 mm) therebetween at the linear portion when welded, and as increasing a space (gap or width), the possibility that a welding failure occurs will be increased.

In the case of the laser welding, a welding failure occurs even with a very small space.

In a case in which the butt welding is performed between curved portions formed in the thin sheet 11 and the thick sheet 12, it is necessary to accurately cut and butt against each other the steel sheets of the thin sheet 11 and the thick sheet 12 before welding. Even if the thin sheet 11 and the thick sheet 12 are accurately cut, thermal strain may occur in the steel sheets of the thin sheet 11 and the thick sheet 12 due to welding heat input during the welding process. Thus, it is difficult to perform the butt welding particularly at the curved portions. A welding failure may thereby occur in the butt welding between the curved portions.

Further, in a case in which the butt welding is performed between corner portions provided in the thin sheet 11 and the thick sheet 12 constituting the different thickness steel sheet 10 (i.e., tailor welded blank) as disclosed in Patent Document 1, the corner portions are subjected to heat input twice during the welding. Thus, a heat input quantity increases, and there increases a possibility that a welding failure occurs.

Moreover, in a case of presence of an intersection such as a corner portion in a weld line, a welding failure tends further to occur.

However, in the case of the different thickness steel sheet 10 shown in FIGS. 1 and 2 according to the present embodiment, the different thickness connection (the tailor blank welding) is performed between the cutout portion 13 of the thin sheet 11 and the thick sheet 12, and at this point, the linear portions of the cutout portion 13 of the thin sheet 11 and the thick sheet 12 are butt-welded together so as to form the linear weld lines 15a and 15b.

Then, the thin sheet 11 and the thick sheet 12 are overlapped with each other at the curved portion to form an overlap margin portion 16, and the overlap margin portion 16 is lap-welded to form the curved weld line 15c.

Thus, according to such process, the tailor welded blank 10 can be formed by joining the thin sheet 11 and the thick sheet 12 by the butt welding between the linear portions of the cutout portion 13 of the thin sheet 11 and the thick sheet 12, and by the lap welding only at the overlap margin portion 16 between the thin sheet 11 and the thick sheet 12. The linear weld lines 15a and 15b are connected via the curved weld line 15c by the different thickness connection.

The tailor welded blank 10 is thus fabricated as described above.

As described above, the tailor welded blank 10 is formed by joining the thin sheet 11 and the thick sheet 12 by the simple lap welding at the overlap margin portion 16. It is thus not necessary to perform any butt welding between the thin sheet 11 and the thick sheet 12 at the curved portion (the overlap margin portion 16). Accordingly, the welding is easily performed, the different thickness connection (the tailor blank welding) is simplified, and high accuracy weld-joining can be performed within a short period of time.

The overlap margin portion 16 of the tailor welded blank 10 is punched and cut out in press forming after the weld joining, thereby forming an opening portion.

[First Embodiment]

Figure 3:
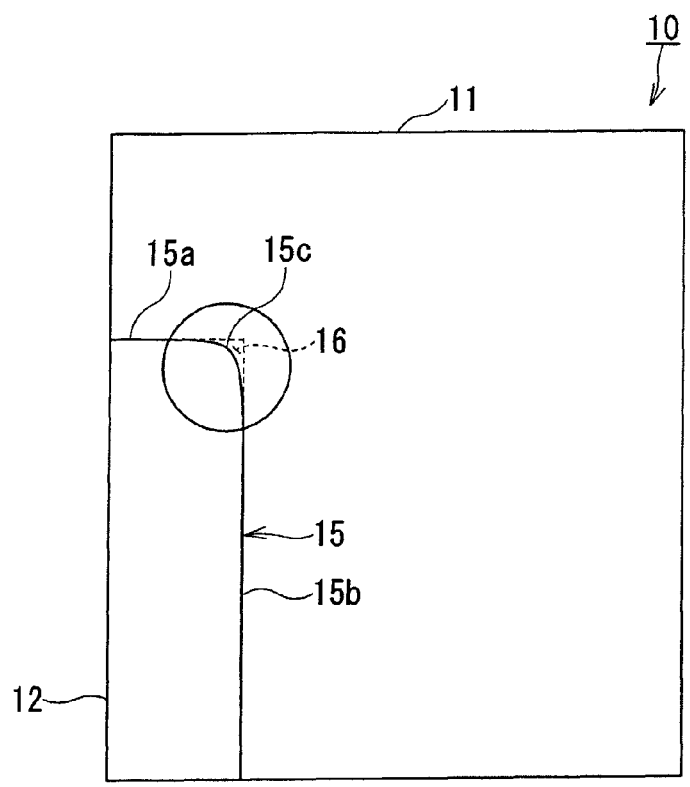
FIG. 3 is a view illustrating a structure of an example of a tailor welded blank of different thickness steel sheets that constitutes a door inner panel as automobile parts according to a first embodiment.
Figure 4:
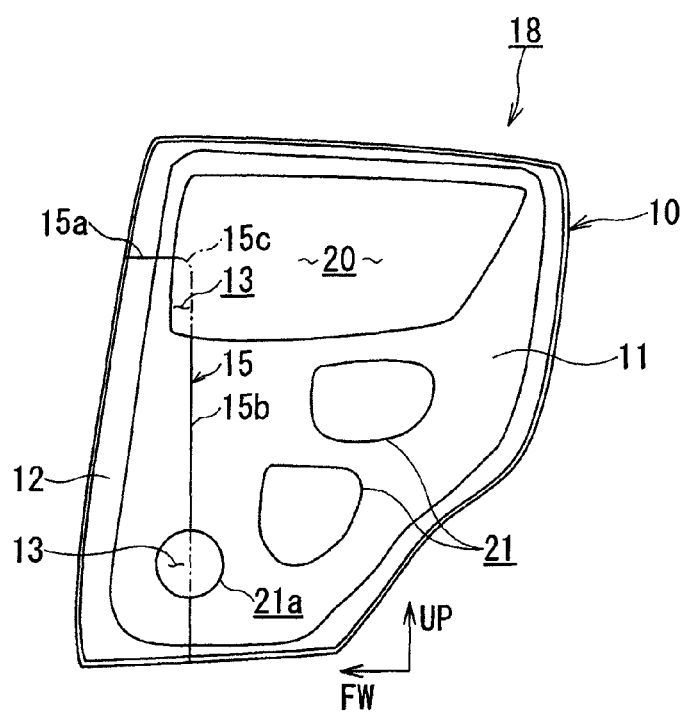
FIG. 4 is a view illustrating a configuration of a door inner panel of a vehicle side door as the door inner panel as automobile parts according to the first embodiment of the present invention.

FIGS. 3 and 4 show a first embodiment of a door inner panel of a side door as automobile parts.

The door inner panel as automobile parts according to the present embodiment is applied to a door inner panel 18 of a vehicle side door as a vehicle opening/closing door. The door inner panel 18 is composed of the tailor welded blank (i.e., welded different thickness steel sheets) 10 formed by different thickness connection between the steel sheets of the thin sheet 11 and the thick sheet 12. The tailor welded blank 10 is subjected to press forming after weld joining to fabricate the door inner panel 18. The same elements as those of the different thickness steel sheet 10 in FIGS. 1 and 2 are assigned the same reference numerals to omit or simplify the description thereof.

The tailor welded blank 10 shown in FIG. 3 is subjected to the press forming after the weld joining by laser welding or the like to thereby fabricate the door inner panel 18. In the forming process, the tailor welded blank 10 is formed into a door inner panel shape with concavities and convexities appropriate for the vehicle side door. The overlap margin portion 16 of the tailor welded blank 10 is punched and cut out as shown in FIG. 3.

An opening portion 20 having a substantially inverted trapezoidal shape that forms a window portion is formed by punching out the overlap margin portion 16 of the tailor welded blank 10. The opening portion 20 is provided penetrating through a center upper portion of the door inner panel 18 so that the opening portion has the vehicle longitudinal length larger than the vehicle vertical length.

One or more opening portions 21 are also formed as work holes to which structural parts of the vehicle side door are mounted or as holes for weight saving in the different thickness steel sheet 10 of the door inner panel 18 in addition to the window opening portion 20.

In FIG. 4, a vehicle front side is indicated by an arrow FW, and a vehicle upper side is indicated by an arrow UP in the door inner panel 18 of the vehicle side door. The vehicle side door is a rear side door arranged at a side portion of a vehicle.

The vehicle side door may be also a front side door. The vehicle side door includes a door outer panel, not shown, arranged on an outer side of the side door, and the door inner panel 18 arranged on an inner side of the side door. A window glass, not shown, is arranged between the door inner panel 18 and the door outer panel so as to move up and down in a vehicle vertical direction.

In the vehicle side door, the door inner panel 18 is divided into two regions of the thin sheet 11 having a large area, and the thick sheet 12 having a smaller area than the thin sheet 11. A hinge portion with which the vehicle side door is mounted to a vehicle body side is provided in the region of the thick sheet 12 on the vehicle front side.

In the door inner panel 18 of the vehicle side door, the thick sheet 12 is provided on the door hinge side where physical and mechanical strength is required, and the thin sheet 11 is provided in the other region for the purpose of weight saving. The opening portions 20 and 21 are formed at desired positions of the thin sheet 11.

In the tailor welded blank 10 constituting the door inner panel 18, the curved shaped edge portion 13c is formed at the cutout portion 13 of the thin sheet 11. An overlap portion between the edge portion 13c and the thick sheet 12 is lap-welded by laser welding or the like. Thus, the butt welding is not required at the curved portion. The weld line 15 can be thereby welded with high quality.

The weld line 15 of the tailor welded blank 10 is composed of the linear weld lines 15a and 15b, and the curved weld line 15c. The tailor welded blank 10 can be formed by means of the different thickness connection by continuously welding the weld line 15 from one end side of the weld line 15 (the weld line 15a or 15b) to another end side thereof through the curved weld line 15c by the laser welding or the like.

Thus, the different thickness steel sheet 10 is formed by the different thickness connection as described above as the tailor welded blank. The overlap margin portion 16 between the thin sheet 11 and the thick sheet 12 of the tailor welded blank 10 is punched (cut) out by the press forming after the weld joining to form the opening portion 20. Since the door inner panel 18 is fabricated as described above, there is no influence of the overlap margin on the product.

In the weld joining of the different thickness steel sheet 10, the thin sheet 11 and the thick sheet 12 are fixed so as to be butted against each other at the linear portions and be overlapped with each other at the curved portion between the linear portions to form the overlap margin portion 16. The welding is then started by laser welding or the like. At this time, the joining strength of the weld line 15 of the different thickness steel sheet 10 is ensured by performing the butt welding along the linear weld lines 15a and 15b, and the lap welding along the curved weld line 15c at the overlap margin portion 16. Moreover, the welded line 15 of the different thickness steel sheet 10 can be continuously and smoothly welded from one of the weld lines 15a and 15b to another of the weld lines 15b and 15a through the curved weld line 15c. Thus, the different thickness connection process is simplified. The curved weld line 15c is subjected to the lap welding, not the butt welding. Thus, the welding can be easily performed with high quality.

Furthermore, the thin sheet 11 constituting the different thickness steel sheet (the tailor welded blank) 10 is butted against the thick sheet 12 at the linear portions, and is overlapped with the thick sheet 12 only at the curved portion so as to obtain the overlap margin. The tailor welded blank can be fabricated as described above.

Moreover, the different thickness steel sheet 10 is fabricated by the different thickness connection between the thin sheet 11 and the thick sheet 12 by performing the butt welding at the linear portions, and the lap welding along the curved weld line between the linear portions. Thus, the welding can be performed along the curved shape with no corner portion (no intersection). Accordingly, the stress concentration in the press forming can be relieved.

(First Modification)

Figure 5:
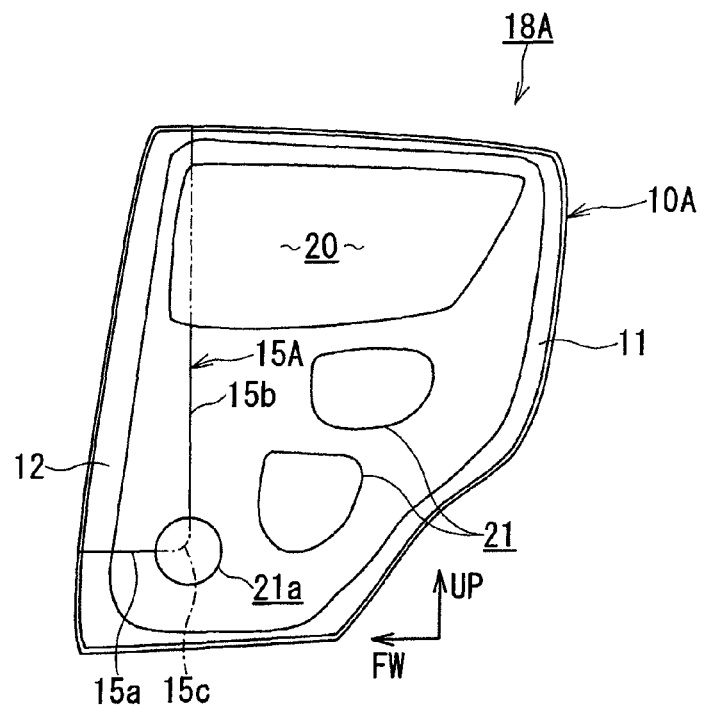
FIG. 5 is a view illustrating a configuration of a door inner panel of a vehicle side door according to a first modification of the first embodiment of the door inner panel as automobile parts.

FIG. 5 shows a first modification of the first embodiment of the door inner panel of the side door as automobile parts.

A door inner panel 18A according to the first modification is a variation of the door inner panel 18 shown in FIG. 4, and differs therefrom only in the shape of the weld line. Thus, the same elements are assigned the same reference numerals mentioned with respect to the first embodiment, and duplicated description will be omitted or simplified herein.

The door inner panel 18A shown in FIG. 5 is composed of a tailor welded blank (composed of different thickness steel sheets) 10A formed by different thickness connection between the thin sheet 11 and the thick sheet 12. The tailor welded blank 10A is subjected to press forming after weld joining to fabricate the door inner panel 18A. The door inner panel 18A does not differ from the door inner panel 18 according to the first embodiment in this viewpoint.

On the other hand, the door inner panel 18A differs from the door inner panel 18 according to the first embodiment in an arrangement position where the thick sheet 12 is welded and joined to the thin sheet 11.

In the door inner panel 18A according to the first modification, a cutout portion is provided in an upper portion on a vehicle front side of the thin sheet 11. The thick sheet 12 is arranged in and fixed to the cutout portion. The tailor welded blank 10A is formed from different thickness steel sheet by means of the different thickness connection between the thin sheet 11 and the thick sheet 12. Thus, the weld line 15 of the tailor welded blank 10A does not differ from the weld line 15 of the tailor welded blank 10 according to the first embodiment in that the weld line 15 is composed of the linear weld lines 15a and 15b and the curved weld line 15c. However, the linear weld line 15a and the R (curve line) shaped weld line 15c are formed in a lower portion on the vehicle front side of the thin sheet 11.

Thus, while the opening portions 20 and 21 (21a) are formed by punching (cutting) out the different thickness steel sheet 10A by the press forming after the weld joining, the curved weld line 15c is punched out to form a lower-side opening portion 21a of the door inner panel 18A, not the opening portion 20 for the window portion.

In the tailor welded blank 10A, the curved portion is lap-welded. Thus, butt welding is not required at the curved portion. The different thickness steel sheet 10A can be thereby easily welded with high quality as tailor welded blank.

Since the other elements and advantages of the door inner panel 18A as automobile parts are the same as those of the door inner panel 18 shown in FIG. 4, the description thereof is omitted herein.

(Second Modification)

Figure 6:
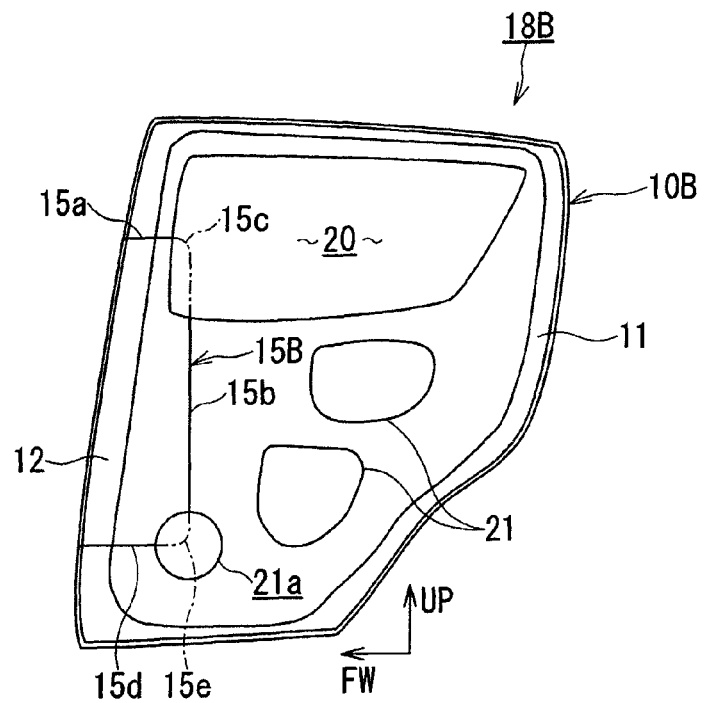
FIG. 6 is a view illustrating a configuration of a door inner panel of a vehicle side door according to a second modification of the first embodiment of the door inner panel as automobile parts.

FIG. 6 shows a second modification of the first embodiment of the door inner panel of the side door as automobile parts.

A door inner panel 18B according to the second modification is a second variation of the door inner panel 18 shown in FIG. 4 and differs therefrom only in the shape of the weld line. Thus, the same elements are assigned the same reference numerals as those applied to the first embodiment, and duplicated description will be omitted herein.

The door inner panel 18B shown in FIG. 6 is composed, as tailor welded blank, of a different thickness steel sheet 10B formed by means of different thickness connection between the thin sheet 11 and the thick sheet 12. The tailor welded blank 10B is subjected to press forming after weld joining to fabricate the door inner panel 18B. The door inner panel 18B does not differ from the door inner panel 18 according to the first embodiment in this viewpoint.

The door inner panel 18B differs from the door inner panel 18 according to the first embodiment in an arrangement position where the thick sheet 12 is welded and joined to the thin sheet 11.

In the door inner panel 18B according to the second modification, a square U-shaped cutout portion is provided in an upper portion on a vehicle front side of the thin sheet 11. The thick sheet 12 is arranged in and fixed to the cutout portion. The tailor welded blank 10B is formed, from the different thickness steel sheet, by means of the different thickness connection between the thin sheet 11 and the thick sheet 12. Thus, the weld line 15 of the tailor welded blank 10B is composed of three linear weld lines 15a, 15b, and 15d, and two curved weld lines 15c and 15e. The weld line 15 of the tailor welded blank 10B differs from the weld line 15 of the different thickness steel sheet 10 according to the first embodiment in that the linear weld line 15d and the curved weld line 15e are formed in a lower portion on the vehicle front side of the thin sheet 11.

Thus, while the opening portions 20, 21, and 21a are formed by punching (cutting) out the tailor welded blank 10B by the press forming after the weld joining, the curved weld lines 15c and 15e are respectively punched out to form the opening portion 20 for the window portion and the lower-side opening portion 21a.

In the different thickness steel sheet 10B, the curved portion is lap-welded. Thus, the butt welding is not required at the curved portion. The different thickness steel sheet 10B can be thereby easily welded with high quality as tailor welded blank.

[Second Embodiment]

Figure 7:
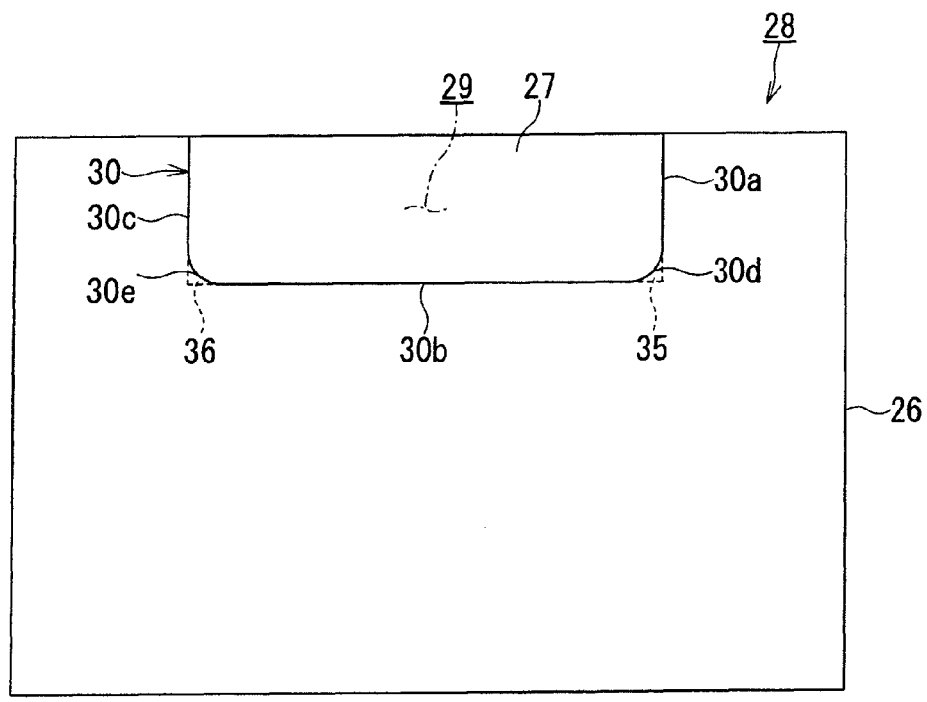
FIG. 7 is a view illustrating a configuration of an example of a tailor welded blank, formed with different thickness steel sheets, that constitutes a door inner panel as automobile parts according to a second embodiment.
Figure 8:
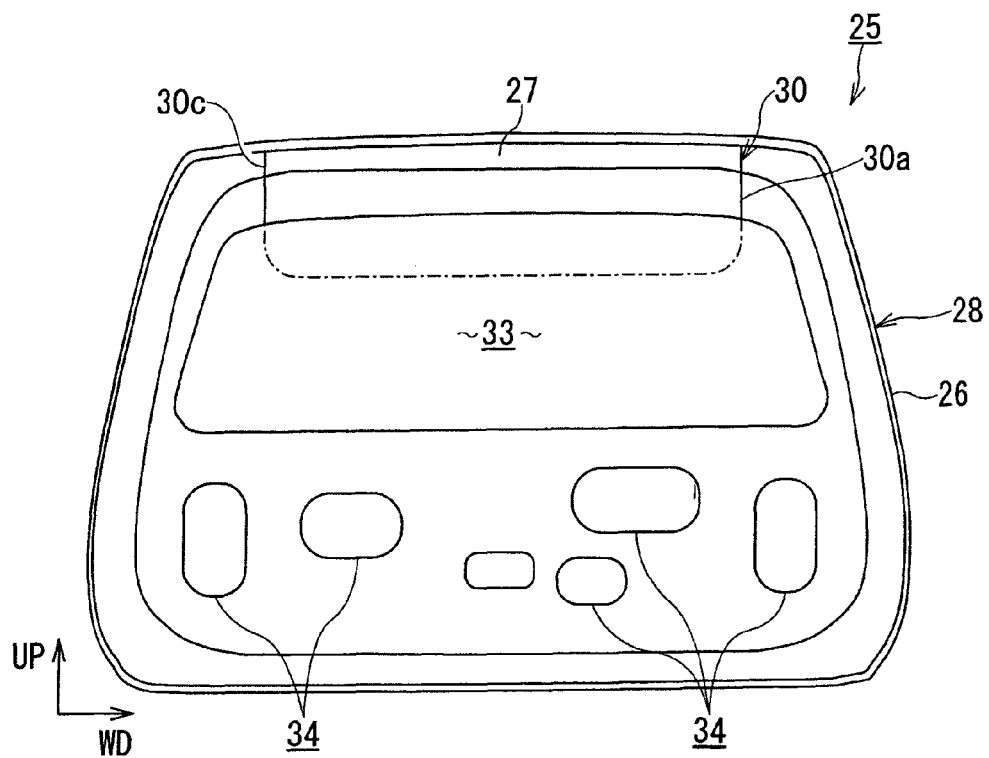
FIG. 8 is a view illustrating a configuration a door inner panel of a vehicle back door as the door inner panel as automobile parts according to the second embodiment of the present invention.

FIGS. 7 and 8 show a second embodiment of a door inner panel of a back door as automobile parts.

The door inner panel as automobile parts according to the present second embodiment is applied to a door inner panel 25 of a vehicle back door as a vehicle opening/closing door. The door inner panel 25 is composed of a tailor welded blank 28, formed from a different thickness steel sheet by joining two steel sheets of a thin sheet 26 and a thick sheet 27 with different sheet thicknesses by means of different thickness connection process. The tailor welded blank 28 is subjected to press forming after weld joining to fabricate the door inner panel 25 of the vehicle back door.

The tailor welded blank 28, formed from different thickness steel sheet, shown in FIG. 7 is composed of the thin sheet 26 having a large area, and the thick sheet 27 having a small area. The thin sheet 26 occupies 70% or more, and the thick sheet 27 occupies 30% or less of the area. For example, the thin sheet 26 and the thick sheet 27 have an area ratio of 80%:20%. A cutout portion 29 is formed in the thin sheet 26 by cutting out an upper side portion in a square U shape as shown in FIG. 7. Corner portions of the square U-shaped cutout portion 29 are cut out in a curved shape. The thick sheet 27 having a rectangular shape is arranged in the cutout portion 29 of the thin sheet 26. The thin sheet 26 and the thick sheet 27 are joined together by means of the different thickness connection along a substantially square U-shaped weld line 30 to fabricate the tailored blank from the different thickness steel sheet 28.

The weld line 30 of the tailor welded blank (different thickness steel sheet) 28 shown in FIG. 7 is composed of three linear weld lines 30a, 30b and 30c, and two curved weld lines 30d and 30e that respectively connect the linear weld lines 30a and 30b, and 30b and 30c. The linear weld lines 30a, 30b, and 30c are butt-welded in a linear shape with the substantially square U-shaped cutout portion 29 of the thin sheet 26 and the thick sheet 27 by being butted against each other.

The weld lines 30d and 30e that respectively connect the linear weld lines 30a and 30b, and 30b and 30c are lap-welded in a curved shape with the thin sheet 26 and the thick sheet 27 being overlapped with each other.

After the weld joining by the different thickness connection process, the tailor welded blank 28 formed from the different thickness steel sheet is subjected to the press forming to fabricate the door inner panel 25 of the vehicle back door. The door inner panel 25 is formed as shown in FIG. 8. An opening portion 33 for a back door window and various opening portions 34 as work holes, to which a taillight, a license plate or the like are mounted, are provided in the door inner panel 25 by the press forming.

The curved weld lines 30d and 30e of the tailor welded blank 28 are located in the opening portion 33 for a rear window formed by the press forming. Curved shaped overlap portions 35 and 36 of the tailor welded blank 28 are punched out and removed in the press forming. The curved weld lines 30d and 30e of the tailor welded blank 28 at the curved portions are subjected to lap welding, not butt welding. Accordingly, the welding operation can be easily performed with high welding quality.

In FIG. 8, a vehicle width direction is indicated by an arrow WD, and a vehicle upper side is indicated by an arrow UP in the door inner panel 25 of the vehicle back door. The vehicle back door is an opening and closing door arranged at a rear portion of a vehicle. The vehicle back door includes a door outer panel, not shown, arranged on an outer side of the back door, and the door inner panel 25 arranged on an inner side of the back door. A back door window glass, not shown, is arranged between the door inner panel 25 and the door outer panel.

In the vehicle back door, the door inner panel 25 is divided into two regions of the thin sheet 26 having a large area and the thick sheet 27 having a small area above the thin sheet 26. A hinge portion with which the vehicle back door is mounted to a vehicle body side is provided in the region of the thick sheet 27 on the vehicle upper side. In the door inner panel 25 of the vehicle back door, the thick sheet 27 is provided in the door hinge mounting portion where physical and mechanical strength is required, and the thin sheet 26 is provided in the other region for the purpose of weight saving. The opening portions 33 and 34 are formed at desired positions of the thin sheet 26 for the purpose of weight saving.

In the tailor welded blank 28 formed from the different thickness steel sheet constituting the door inner panel 25, curved edge portions are formed at the cutout portion 29 of the thin sheet 26. The overlap portions 35 and 36 between the thin sheet 26 and the thick sheet 27 are formed at the edge portions. The overlap portions 35 and 36 are lap-welded by means of laser welding or the like. Thus, the butt welding is not required at the curved portions. The weld line 30 can be thereby welded with high quality.

Furthermore, the weld line 30 of the tailor welded blank 28 is composed of the three linear weld lines 30a, 30b and 30c, and two curved weld lines 30d and 30e. The different thickness steel sheet 28 can be formed by means of different thickness connection by continuously welding the weld line 30 from one end side of the weld line 30 (the weld line 30a or 30c) to another end side thereof through the curved weld line 30d or 30e by laser welding or the like. The different thickness steel sheet 28 is formed by the different thickness connection as described above.

The overlap margin portions 35 and 36 between the thin sheet 26 and the thick sheet 27 of the different thickness steel sheet (tailor welded blank) 28 are punched (cut) out by the press forming after the weld joining to form the opening portions 33 and 34. Since the door inner panel 25 is fabricated as described above, there is no influence of the overlap portions between the thin sheet 26 and the thick sheet 27 on the product.

In the weld joining of the different thickness steel sheet 28, the thin sheet 26 and the thick sheet 27 are fixed so as to be butted against each other at the linear portions and overlapped with each other at the curved portions between the linear portions to provide the overlap margin portions 35 and 36. The welding is then started by laser welding or the like. At this time, joining strength of the weld line 30 of the different thickness steel sheet 28 is ensured by performing the butt welding along the linear weld lines 30a, 30b, and 30c, and the lap welding along the curved weld lines 30d and 30e at the overlap margin portions 35 and 36.

Moreover, the weld line 30 of the different thickness steel sheet 28 can be continuously and smoothly welded from one of the weld lines 30a and 30c to another of the weld lines 30c and 30a through the curved weld lines 30d and 30e. Thus, the different thickness connection process can be simplified. The curved weld lines 30d and 30e are subjected to the lap welding, not the butt welding. Thus, the welding can be easily performed with high quality.

Furthermore, the steel sheets (the thin sheet 26 and the thick sheet 27) before welding can be fabricated such that the thin sheet 26 constituting the different thickness steel sheet (the tailor welded blank) 28 is butted against the thick sheet 27 at the linear portions, and is overlapped therewith only at the curved portions so as to obtain the overlap margins. Moreover, the tailor welded blank 28 is fabricated by the different thickness connection between the thin sheet 26 and the thick sheet 27 by performing the butt welding at the linear portions, and the lap welding only at the curved portions between the linear portions. Thus, the welding is performed with no corner portion (no intersection). Accordingly, stress concentration in the press forming can be relieved.

(Modification)

Figure 9:
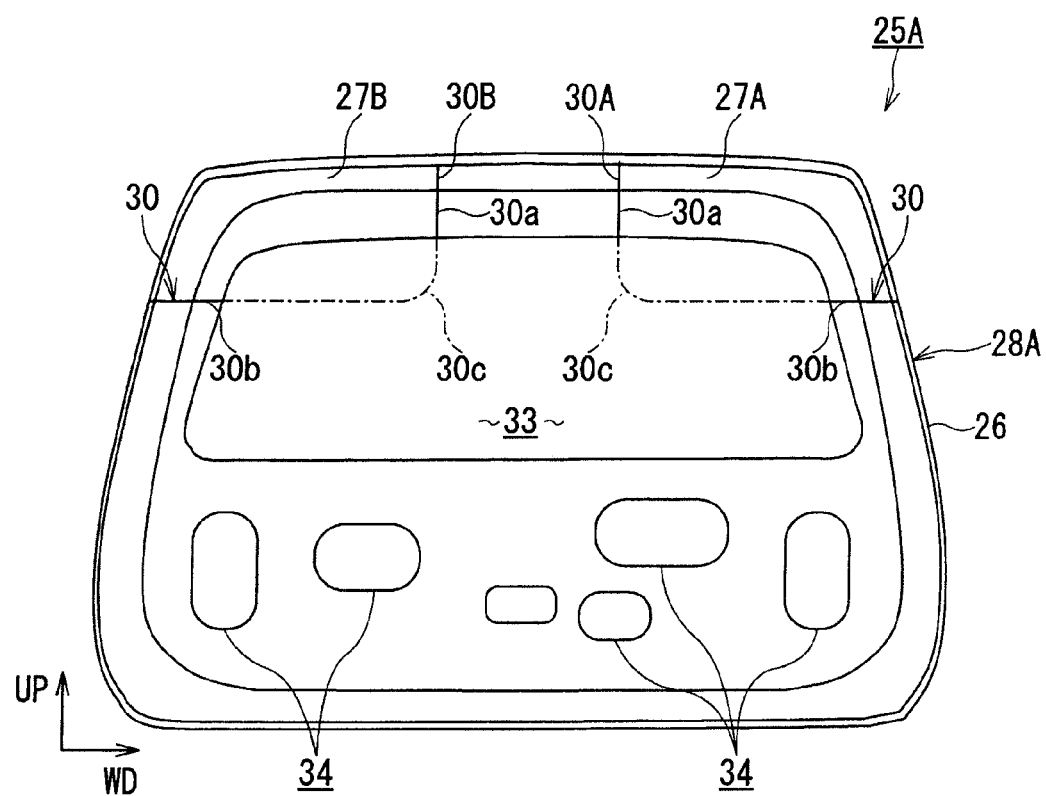
FIG. 9 is a view illustrating a configuration of a door inner panel of a vehicle back door according to a modification of the second embodiment of the door inner panel as automobile parts.

FIG. 9 shows a modification of the second embodiment of the door inner panel of the back door as automobile parts.

A door inner panel 25A according to the modification is a variation of the door inner panel 25 shown in FIG. 8, and differs therefrom only in the shape of the weld line. Thus, the same elements are assigned with the same reference numerals to omit the duplicated description.

The door inner panel 25A shown in FIG. 9 is composed of a tailor welded blank 28A formed by means of different thickness connection between the thin sheet 26 and two right and left thick sheets 27A and 27B (different thickness steel sheet 28A) located on both sides in a vehicle width direction. The different thickness steel sheet 28A is subjected to press forming after weld joining to fabricate the door inner panel 25A. The door inner panel 25A does not differ from the door inner panel 25 according to the second embodiment in a basic configuration. The door inner panel 25A of this modification differs from the door inner panel 25 according to the second embodiment in an arrangement configuration in which the two right and left thick sheets 27A and 27B are welded and joined to the thin sheet 26.

In the door inner panel 25A shown in FIG. 9, two right and left cutout portions are provided in an upper portion on a vehicle front side of the thin sheet 26. The two thick sheets 27A and 27B are arranged in and fixed to the cutout portions. The different thickness steel sheet is formed into trailer welded blank 28A by the different thickness connection between the thin sheet 26 and the thick sheets 27A and 27B. Thus, weld lines 30A and 30B of the different thickness steel sheet 28A are respectively composed of the two linear weld lines 30a and 30b and the curved weld line 30c. Unlike in the door inner panel 25 according to the second embodiment, the linear weld lines 30a and 30b and the curved weld line 30c are formed on right and left sides in the vehicle width direction at the upper portion of a vehicle rear end portion of the thin sheet 26.

Thus, while the opening portions 33 and 34 for a back door window are formed by punching (cutting) out the tailor welded blank 28A by the press forming after the weld joining, the curved weld lines 30c are punched out and removed by the press forming since the weld lines 30c are located in the wide opening portion 33 for a back door window.

In the different thickness steel sheet 28A, the curved portion is lap-welded. Thus, butt welding is not required at the curved portion. The different thickness steel sheet 28A can be thereby easily welded with high quality into the tailor welded blank.

Since the other elements and advantages of the door inner panel 25A as automobile parts are the same as those of the door inner panel 25 shown in FIG. 8, the description thereof will be omitted herein.

The example in which the door inner panel as automobile parts according to the respective embodiments is applied to the door inner panel of the vehicle side door or the vehicle back door has been described above. However, the present invention is not limited to the door inner panel, and may be also applied to a different thickness steel sheet formed by different thickness connection by joining different kinds of steel sheets of a thin sheet and a thick sheet with different sheet thicknesses along a linear line and a curve line, and the present invention is also applied to a method for manufacturing the same.

What is claimed is:

1. A method for manufacturing a door inner panel for an automobile, comprising the steps of:
    preparing two different steel sheets comprising a thin sheet and a thick sheet, the thin sheet having a cutout portion with a curved portion, and the thick sheet being arranged in the cutout portion of the thin sheet;
    overlapping the thin sheet and the thick sheet at the curved portion to form an overlap margin portion;
    performing butt welding between linear portions of the cutout portion of the thin sheet and the thick sheet to form linear weld line portions; and
    performing lap welding at the overlap margin portion between the thin sheet and the thick sheet to connect the linear weld line portions via a curved weld line portion to thereby form a different thickness steel sheet as a tailor welded blank.

2. The method for manufacturing a door inner panel for an automobile according to claim 1, wherein the overlap margin portion of the tailor welded blank is cut out by press forming, after the welding steps are performed, to form an opening portion.

3. The method for manufacturing a door inner panel for an automobile according to claim 1, wherein a hinge portion is formed in the thick sheet to connect the door inner panel to a vehicle body through the hinge portion.

* * * * *